Feb. 11, 1964 G. H. PIEL 3,120,888
VIBRATING FEEDER TROUGH
Filed Sept. 16, 1959 2 Sheets-Sheet 1
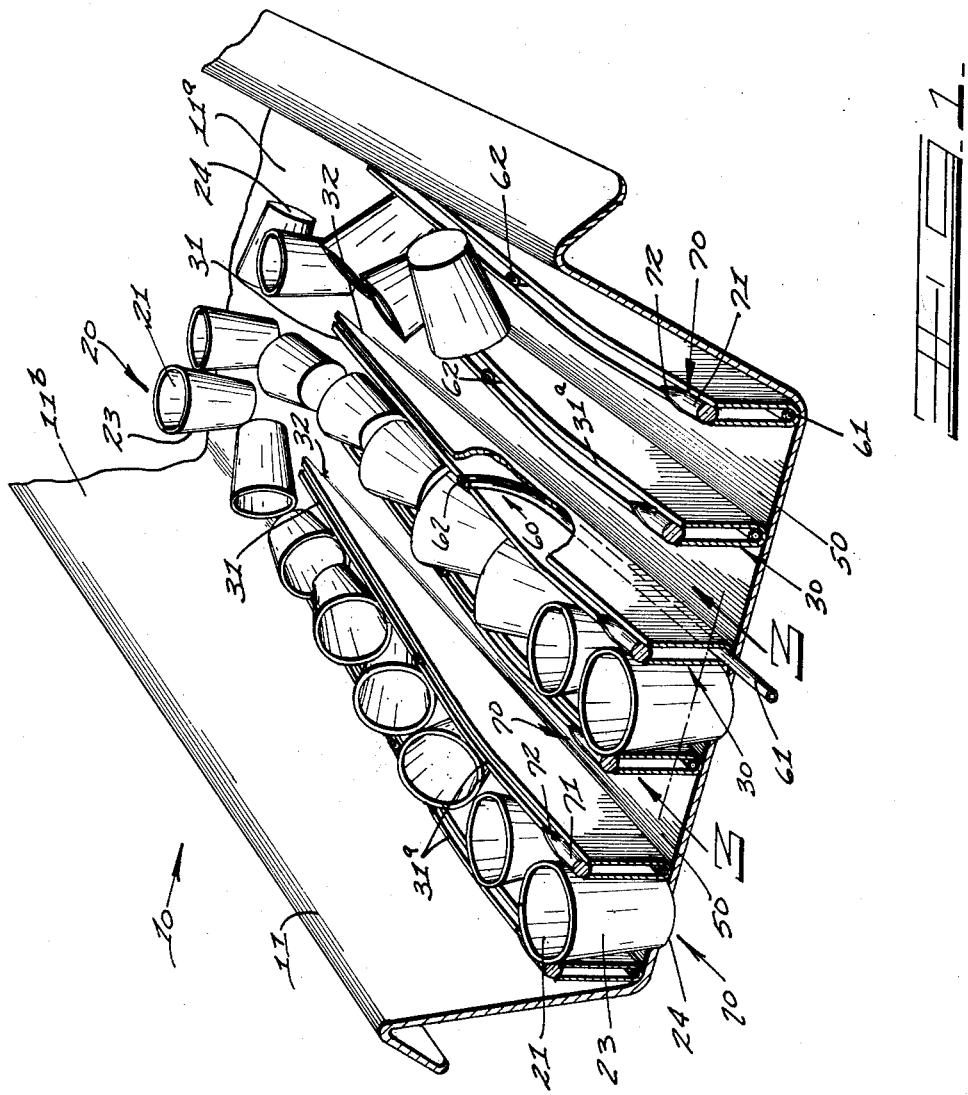
INVENTOR.
GERHARDT H. PIEL
BY W. G. Schaich
& J. Ralph Hoge
ATTORNEYS.

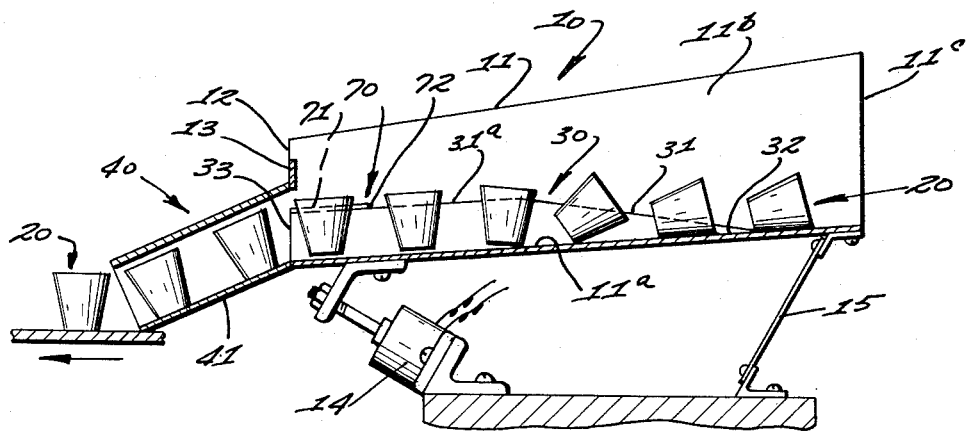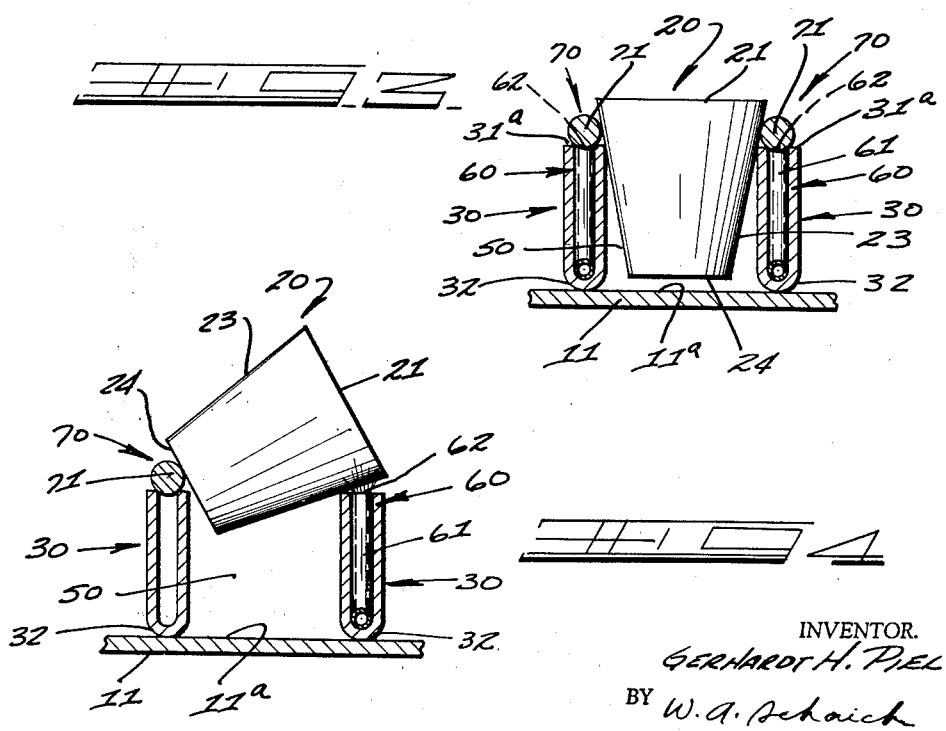

3,120,888
VIBRATING FEEDER TROUGH
Gerhardt H. Piel, West Chicago, Ill., assignor to Owens-Illinois Glass Company, a corporation of Ohio
Filed Sept. 16, 1959, Ser. No. 840,428
7 Claims. (Cl. 198—33)

The present invention relates to a method for automatically orienting tapered closures or other truncated cone shaped objects to a uniform position, said position being a standing position with the major diameter end of said closure being up. More particularly, the invention relates to an improved vibrating feeder trough having specially shaped rails fixed to the trough. The effect of the rails is that they orient tapered closures to a standing position as the closures are propelled forward along the trough by vibrations induced to the trough. In addition to the specially shaped rails, the vibrating feeder trough also contains other means to aid in orienting the tapered closures or truncated cone shaped objects.

Vibrating feeder troughs are commonly used for conveying or feeding small objects. Many times these objects are to be conveyed to some further operation where the machine performing the operation requires that the objects objects be conveyed or fed to it in a uniform position. This is true with respect to tapered closures, when liners have to be inserted in the closures. Prior to being fed to the lining machine, which is a machine which automatically inserts liners in closures, the closures have to be sequentially conveyed from a hopper and have to be oriented to a uniform position, namely with their open ends uppermost. One method of doing this would be to manually pick up each tapered closure and place it in a standing position with the major diameter end of the said closure up. In this position, the closure then could be fed into the lining machine. This method has the obvious disadvantages associated with manual labor, namely, being too slow and costly.

Accordingly, it is an object of this invention to provide a method of simultaneously sequentially feeding and orienting tapered closures or other truncated cone shaped objects to an upright position with the major diameter end up.

Another object of this invention is to provide an improved vibrating feeder trough which will orient tapered closures or other truncated shaped objects to a standing position with the major diameter end up simultaneously with the sequential conveyance of said objects.

A further object of this invention is to provide a method for orienting tapered closures or truncated cone shaped objects without manual assistance.

A still further object of this invention is to provide an improved vibrating feeder trough for tapered closures which will orient such tapered closures to a desired uniform position and will prohibit unoriented closures from passing from the feeder trough.

The specific nature of this invention, as well as other objects and advantages thereof, will become apparent to those skilled in the art from the following detailed description taken in conjunction with the annexed sheets of drawings on which, by way of example only, the preferred embodiments of this invention are illustrated.

As represented by the drawings:

FIG. 1 is a perspective view of a vibrating feeder trough incorporating an orienting device in accordance with this invention.

FIG. 2 is a side elevational view of the vibrating feeder trough, enclosed chute and vibration induction unit with parts in section.

FIG. 3 is a sectional view on the plane 3—3 of FIG. 1 showing a tapered closure in properly oriented position.

FIG. 4 is a sectional view similar to FIG. 3, with one air tube and one pencil-shaped rod removed for purposes of clarity, showing a tapered closure improperly oriented relative to the feeder trough.

The present invention relates to an improved vibrating feeder trough 10 wherein tapered closures or similarly shaped objects 20 are automatically oriented to a standing position with the major diameter or open end 21 up as the closures 20 are propelled forward by vibrations induced to the feeder trough 10. The improved vibrating feeder 10 comprises generally a U-shaped, inclined trough member 11 having at least a pair of specially shaped, transversely spaced rails 30 longitudinally fixed in upstanding relation to the bottom or bed 11a of the said trough 11, and extending to a discharge chute 40 attached to the discharge end of the trough 11. Adjacent to the rails 30 are air blast means 60 and cam means 70 to further aid in orienting the tapered closures 20.

The vibrating feeder trough 10 is of any standard type having a trough 11, leaf spring means 15 for supporting one end of the trough 11, and means 14 for inducing vibrations to the trough 11. The means 14 for inducing vibrations comprises a conventional electrical vibration induction unit.

The orienting rails 30 are wedge-shaped, having lower edges 32 abutting the bottom of the trough 11 and sloped upper edges 31. Each rail 30 may be formed from a single sheet of material bent longitudinally to form a U, the light portion of the U-shape constituting the lower edge 32.

The rails 30 are located adjacent the discharge end 12 of the trough 11, the discharge end 33 of the rails 30 terminating at the discharge chute 40. Each pair of rails 30 is spaced apart a distance slightly less than the major diameter 21 of the tapered closure 20 but greater than the minimum diameter end 24. This spacing allows the tapered portion 23 of a tapered closure 20, placed between the rails in a standing position with the major diameter end 21 up, as illustrated in FIG. 3, to be supported by the upper edges 31 of a pair of rails 30. A tapered closure 20 having an overall height greater than its major diameter 21 would not be able to pass through a channel 50 in a lying down, inverted, or crooked position as shown in FIG. 4.

That portion 31a of the upper edge 31 of a rail 30, which is located toward the discharge end 12 of the trough 11, is essentially parallel to the bed 11a of the trough 11 and spaced therefrom by a distance sufficient to give some vertical clearance between the bed of the trough 11 and the dome 24 of a tapered closure 20 properly supported in a channel 50 by two rails 30.

The entire lateral width of the trough 11 is occupied by the spaced feed rails 30, with the outermost rails being closely adjacent the chute side walls 11b. A vertical stop wall 13 traverses trough 11 just beyond the discharge ends of rails 30 and prevents horizontally disposed closures 20 from rolling out of trough 11 on top of rails 30.

Attached to the lower discharge end 12 of the trough 11 is a more sharply inclined enclosed chute 40. This is illustrated in FIG. 2. The chute 40 is of rectangular cross-section and open at both ends. The bottom 41 of the chute 40 and the bead 11a of the trough 11 meet and form a smooth surface. The internal vertical height of the chute 40 is greater than the overall height of the tapered closure 20 being oriented, but the resulting vertical clearance is less than that which is required to permit a closure 20 to tip over in the chute 40. The chute 40 may be constructed of any suitable material such as sheet metal and supplies the oriented closures to any desired machine for further processing.

Longitudinal feeding vibrations are induced to the trough 11 by the vibration induction unit 14. Closures are dropped in the trough 11 heterogeneously. The induced vibrations propel tapered closures 20 in the trough 11 forward, that is, from the receiving end 11c to the discharge end 12 of the trough 11. These unoriented tapered closures 20 move forward until they contact the inclined portion of the upper edge 31 of the rails 30. The above-described spacing of each adjacent pair of rails 30 and the inclination of said upper rail edges 31 is such that the forward moving closure 20 is forced to gradually assume a standing position with the major diameter end 21 up as the said closure 20 moves along a particular channel 50. This action results from the tapered shape of the closure 20 and the relatively heavy dome portion 24.

Occasionally a tapered closure 20 will succeed in climbing the rails 30 in an unoriented manner as illustrated in FIG. 4. To orient these incorrectly positioned tapered closures 20, air blast means 60 and cam means 70 are provided to lateralley deflect or unbalance such closures.

The air blast means 60 is located within each hollow rail 30 and hence outside the channel 50 of which the rail 30 is a part. The air blast means 60 is formed by fixing a tube 61 within each said rail 30, and locating the outlet 62 of the tube 61 in such a position that pressured air emitted from the tube 61 will strike a tapered closure riding on top of and not properly between the two rails 30. The air blast will laterally deflect and unbalance an improperly oriented closure 20 and this together with the induced vibrations will cause the closure 20 to seek its most stable position relative to the rails 30 which is the desired oriented position.

It should be particularly noted that the disposition of the air blast within each rail 30 produces a maximum shifting force on improperly oriented closures but has negligible effect on properly oriented closures moving between rails 30.

The cam means 70 comprises a pencil-shaped rod 71 located on the top of the rails 30, near the discharge end 33 thereof, and so positioned that the pointed end 72 of the rod 71 will contact a forward moving tapered closure 20 riding on top of and not between two rails 30 forming a channel 50. The closure 20 so contacted will tend to be laterally deflected and hence to re-orient. This deflection and unbalancing of the closure together with the action of the induced vibrations will cause the closure to fall into said channel 50.

Correctly oriented tapered closures 20, that is, closures 20 in a standing position with the major diameter end 21 up between two rails 30 forming a channel 50, will move forward until they leave the rails 30 and enter the attached enclosed chute 40. This chute 40, as before described, has a limited vertical clearance. This clearance is limited so as to prevent the standing tapered closure 20 from tipping over as it is propelled along in the chute 40 by the induced vibrations. The proximate relationship between the ends 33 of the rails 30 and the enclosed chute 40 together with the aforementioned condition, that is, closures 20 may pass through a channel 50 only in a standing position with the major diameter end 21 up, prevents improperly oriented closures 20 from entering the enclosed chute 40 and hence prevents the improperly oriented closures 20 from being discharged from the improved vibrating feeder trough 10.

Obviously, any desired number of channels 50 may be provided in the vibrating feeder trough 11. The number of channels 50 is determined by the rate of flow required, the size of the tapered closures 20 and the width of trough 11. Within each channel 50, the closures are fed sequentially and in the desired oriented position.

It will, of course, be understood that various details of construction may be modified through a wide range without departing from the principles of this invention, and it is not, therefore, the purpose to limit the patent granted hereon other than necessitated by the scope of the appended claims.

I claim:

1. Apparatus for orienting frustum-shaped articles having major and minor diameter ends to a standing position with the major diameter end up comprising, a feeder trough having a bed portion, means for supporting said trough with said bed portion inclined downwardly in a forward direction, at least one pair of upstanding longitudinally extending rails fixed to the bed of said trough, said rails being parallel to each other and spaced apart a distance less than said major diameter but greater than said minor diameter, said rails defining a channel, said rails having their upper edges downwardly inclined at their rearward ends relative to said bed to merge with said bed, and means for vibrating said trough to feed said articles forwardly along said channel, with the minor diameter ends moving between said rails and said major diameter ends moving over the top edges of said rails whereby said articles will assume said standing position.

2. The apparatus of claim 1 plus means for discharging pressured fluid out of the top surface of said rails, thereby deflecting any of said articles riding bodily on the top of said rails.

3. The apparatus of claim 1 plus means on said rails for laterally deflecting any of said articles bodily riding on the top of said rails to force such closures to fall between said rails.

4. An improved vibrating feeder trough according to claim 1, plus an air discharge tube located adjacent to said rails, means for supplying pressured fluid to said tube, and said tube having its outlet so positioned that air emitted therefrom will contact and shift any of said articles riding on top of said rails but not closures moving between said rails.

5. The apparatus of claim 4 wherein each of said rails is U-shaped and said tubes lie respectively within said rails and said fluid is emitted out of the top surface of said rails.

6. An improved vibrating feeder trough according to claim 1, having article cam means, said means comprising a pencil-shaped rod located on top of each of said rails with the pointed end opposite to the direction of article movement whereby said rod will contact and shift tapered articles riding on top of said rails but not articles moving between said rails.

7. Apparatus for orienting articles having longitudinally spaced apart major and minor diameter ends to a standing position with the major diameter end up comprising, a feeder trough having a bed portion, means for mounting said trough with said bed portion sloped downwardly in a forward direction, a plurality of upstanding longitudinally extending rails fixed to the bed of said trough and defining a lateral series of channels, each pair of rails defining a channel being parallel to each other and spaced apart a distance less than said major diameter but greater than said minor diameter, said rails having their upper edges downwardly inclined at their rearward ends relative to said bed to merge with said bed, and means for vibrating said trough to feed said articles forwardly along said channels with the minor diameter ends moving between said rails and said major diameter ends moving over the top edges of said rails whereby said articles will gradually assume said standing position.

References Cited in the file of this patent

UNITED STATES PATENTS

| | | |
|---|---|---|
| 1,972,489 | Rideout | Sept. 4, 1934 |
| 2,764,274 | Griswold | Sept. 25, 1956 |
| 2,790,532 | Albertoli | Apr. 30, 1957 |
| 2,863,552 | Bailey | Dec. 9, 1958 |